Jan. 17, 1961 M. LICHTENWALTER 2,968,533
RECOVERY OF DIBORANE FROM MIXTURES OF OTHER GASES
Filed Sept. 16, 1955
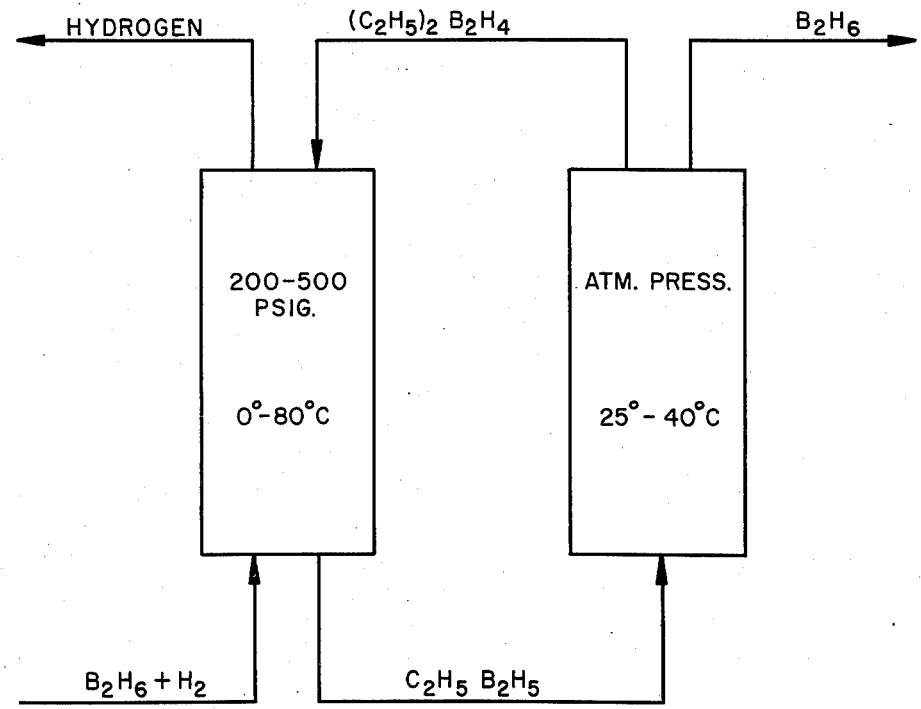
RECOVERY OF DIBORANE
FROM GAS MIXTURES
Myrel Lichtenwalter
INVENTOR.
BY Neal J. Mosely
his Attorney

2,968,533
RECOVERY OF DIBORANE FROM MIXTURES OF OTHER GASES

Myrl Lichtenwalter, Austin, Tex., assignor to Callery Chemical Company, Pittsburgh, Pa., a corporation of Pennsylvania Filed Sept. 16, 1955, Ser. No. 534,732

9 Claims. (Cl. 23—204)

This invention relates to the recovery of diborane from mixtures with other gases.

In the preparation of high energy fuels containing boron such as monoethyldiborane, monoethylpentaborane and monoethyldecaborane a considerable amount of diborane remains in the by-product gas stream and is vented with the hydrogen, ethane and like products of these reactions. These processes are not economical unless the diborane which escapes is recovered. It is not practical to separate the diborane from ethane by ordinary distillation methods because of their close boiling points. The separation of diborane from hydrogen requires bulky and expensive refrigeration equipment. Chemical extraction methods are also impractical. It would therefore be highly desirable if a practical method could be developed by which the diborane could be recovered from hydrogen, ethane and other inert gases which result from the reaction of diborane and unsaturated hydrocarbons such as ethylene.

It is one object of this invention to provide a simple and economical method for recovering diborane from gas mixtures containing hydrogen, ethane or other gases.

Another object is to provide a cyclic process for the recovery of diborane in gas streams containing other inert gases.

Other objects will become apparent as the invention is more fully described in the following specification and appended claims.

This new and improved method for recovering diborane from the by-product gas stream resulting from the reaction of diborane and unsaturated hydrocarbons such as ethylene in the preparation of high energy fuels will be completely disclosed hereinafter and the novelty thereof will be particularly pointed out and distinctly claimed.

In the accompanying drawing to be taken as part of this specification, there is shown a schematic diagram of the cyclic system which has been devised for recovering and separating diborane from other inert gases.

This invention is based upon the discovery that diborane can be recovered from gas streams containing other inert gases such as hydrogen, ethane and the like by carrying out the following reversible reaction:

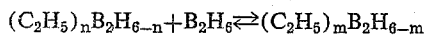

$$(C_2H_5)_nB_2H_{6-n} + B_2H_6 \rightleftarrows (C_2H_5)_mB_2H_{6-m}$$

where $n$ is 2 to 4 and $m$ is less than $n$. This reaction can be forced to proceed in either direction depending upon the pressure and temperature conditions used. At pressures of about 200–500 p.s.i.g. and $+25°$ to $-80°$ C., the reaction shown will proceed to the right for the reaction of diborane with diethyldiborane whereas at atmospheric pressure and temperatures of 25–40° C., the same reaction will proceed to the left.

The cyclic process shown in the accompanying drawing is operated as follows: a gas stream containing diborane along with inert gases such as hydrogen or ethane or a mixture of these is fed into the bottom of a column countercurrent to a stream of diethyldiborane or crude ethyldiboranes from the reaction of ethylene and diborane. The column is operated at a pressure above atmospheric preferably 200–500 p.s.i.g., and at reduced temperatures of $+25°$ C. to $-80°$ C. This countercurrent scrubbing of the diborane-containing gas under pressure and at low temperature causes the reaction as shown in the previous paragraph to proceed to the right and allows the inert gases substantially free of diborane to be vented at the top of the column. The liquid emerging from the bottom of the column (which is essentially monoethyldiborane) is sent to a second column where it is warmed to 25–40° C. and the pressure is reduced to about atmospheric. This treatment results in a reversal of the reaction with the release of pure diborane which is vented at the top of the column. The diethyldiborane formed is then returned to the first column for reaction with more of the original gas stream and the process is repeated.

In one experiment, a hydrogen-diborane-ethane gas mixture containing about 10% diborane was passed countercurrent to a mixture of liquid ethyldiboranes having a composition approximating that of diethyldiborane at about 500 p.s.i.g. and 0° C. The gas mixture evolved at the top of the column contained about 0.5% diborane. The liquid ethyldiboranes upon reduction of the pressure to atmospheric pressure and heating to 25° C. evolved diborane substantially quantitatively.

An experiment approximating conditions which exist at the top of the countercurrent column was carried out in a batch operation as follows: a hydrogen-diborane gas mixture containing 7.6% diborane was added at 460 p.s.i.g. to 35.7 g. (50 ml. of ethyldiboranes analyzing 25.8% boron) in an 80 ml. autoclave at $-28°$ C. The autoclave was shaken and the pressure dropped to 405 p.s.i.g. A sample of gas was removed which upon analysis was found to contain 0.6% diborane.

Another experiment approximating conditions which exist near the bottom of the countercurrent column was carried out batchwise as follows: an 80 ml. autoclave was evacuated and charged with 4.3 g. (6 ml. of ethyldiboranes containing 25.8% boron). The autoclave was cooled to $-78°$ C. and pressurized to 520 p.s.i.g. with a hydrogen-diborane mixture containing 10.6% diborane. The autoclave was shaken to absorb diborane during which time the pressure dropped to 470 p.s.i.g. A gas sample was removed which upon analysis was found to contain 2.5% diborane. The remainder of the gas was vented into a cylinder and analyzed 2.8% diborane. The autoclave was then closed and warmed to 40° C. The pressure was released and 212 ml. of diborane was vented. The liquid in the autoclave was analyzed and found to contain 24.1% boron. It should be noted that the residual liquid was actually slightly lower in boron than the charge liquid.

In other experiments, it was found that countercurrent scrubbing of diborane gas mixtures can be carried out at higher temperatures. However, when such higher temperatures are used substantially higher pressures are necessary to effect reaction of the diborane with the ethyldiboranes. It was also found that ethyldiboranes such as triethyldiborane and tetraethyldiborane may also be used to scrub the diborane gas mixtures. When such diboranes are used, a higher temperature and lower pressure is required to recover diborane from the gas mixture.

Having thus described this invention fully and completely as required by the patent laws, it will be apparent to those skilled in the art that other variations are possible. Thus, within the scope of the appended claims, it should be understood that this invention may be practiced otherwise than as specifically described.

What is desired to be claimed and secured by Letters Patent of the United States is:

1. A method of recovering diborane from a gas stream mixture containing it which comprises intimately contacting said gas stream with a liquid alkyldiborane having the general formula $R_nB_2H_{6-n}$, where R is a lower alkyl radical and $n$ is an integer from 2 to 4, at superatmospheric pressure to form another alkyldiborane having the general formula $R_mB_2H_{6-m}$, where R is a lower alkyl radical and $m$ is an integer and is less than $n$, subjecting the alkyldiborane thus formed to a lower pressure and releasing the diborane therefrom and recovering the released diborane.

2. A method according to claim 1 wherein said liquid alkyldiborane is an ethyldiborane.

3. A method according to claim 1 in which the gas stream is passed countercurrent to the liquid alkyldiborane in one column and the liquid alkyldiborane formed therein is passed to a second column for evolution of diborane.

4. A method according to claim 3 in which the first column is operated at a pressure of 200–500 p.s.i.g. and a temperature of $+25°$ to $-80°$ C.

5. A method according to claim 3 in which the second column is operated at about atmospheric pressure and a temperature of about 25 to 40° C.

6. A cyclic method of recovering diborane from a gas stream mixture containing it which comprises passing said gas stream through a column countercurrent to a stream of mixed lower alkyldiboranes at superatmospheric pressure and low temperature so that the diborane reacts with the lower alkyldiboranes to form a less highly alkylated diborane, venting off the other gases of the mixture, passing the lower alkyldiborane thus formed to a second column operated at a lower pressure and higher temperature than that used in the first column to release pure diborane, recovering the pure diborane, then recycling the lower alkyldiborane thus formed to said first column for further reaction with more of the original gas stream.

7. A method according to claim 6 wherein the alkyldiboranes are ethyldiboranes.

8. A method according to claim 7 in which the first column is operated at a pressure of 200–500 p.s.i.g. and a temperature of $+25°$ to $-80°$ C.

9. A method according to claim 7 in which the second column is operated at about atmospheric pressure and a temperature of about 25 to 40° C.

No references cited.